United States Patent [19]

Omi et al.

[11] Patent Number: 4,767,435

[45] Date of Patent: Aug. 30, 1988

[54] PROCESS FOR PRODUCING TRANSPARENT GLASS PRODUCT HAVING REFRACTIVE INDEX GRADIENT

[75] Inventors: Shigeaki Omi, Saitama; Yoshiyuki Asahara, Tokyo; Seiichi Shingaki, Tokyo; Shin Nakayama, Tokyo; Kenji Nakagawa, Saitama; Tetsuro Izumitani; Hiroyuki Sakai, both of Tokyo, all of Japan

[73] Assignee: Hoya Corporation, Tokyo, Japan

[21] Appl. No.: 937,468

[22] Filed: Dec. 2, 1986

Related U.S. Application Data

[63] Continuation of Ser. No. 699,422, Feb. 7, 1985, abandoned.

[30] Foreign Application Priority Data

Feb. 14, 1984 [JP] Japan .................. 59-24304

[51] Int. Cl.$^4$ .................. C03C 15/00; C03C 17/00; C03C 23/00; C03C 25/00
[52] U.S. Cl. .................. 65/30.13; 65/31; 65/32; 65/900
[58] Field of Search .................. 65/18.3, 30.1, 30.13, 65/31, 32, 900

[56] References Cited

U.S. PATENT DOCUMENTS

| | | | |
|---|---|---|---|
| 4,110,093 | 8/1978 | Macedo et al. | 65/31 |
| 4,110,096 | 8/1978 | Macedo et al. | 65/32 |
| 4,224,177 | 9/1980 | Macedo et al. | 65/32 |
| 4,225,330 | 9/1980 | Kakuzen et al. | 65/32 |
| 4,302,231 | 11/1981 | Macedo et al. | 65/30.13 |
| 4,389,233 | 6/1983 | Kurosaki et al. | 65/30.13 |
| 4,525,189 | 6/1985 | Ohmi et al. | 65/31 |
| 4,528,010 | 7/1985 | Edahiro et al. | 65/31 |
| 4,563,205 | 1/1986 | Asahara et al. | 65/30.13 |

*Primary Examiner*—David L. Lacey
*Assistant Examiner*—Michael K. Boyer
*Attorney, Agent, or Firm*—Cushman, Darby & Cushman

[57] ABSTRACT

A process for producing a transparent glass product having a refractive index gradient by the molecular stuffing method is described. A thallium compound is used as a dopant and, after a concentration gradient of the thallium dopant is formed, the porous glass product is heated up to the temperature region of 350° to 550° C. at a temperature-rising rate of 25° to 150° C./hour in a reducing gas atmosphere and then heat treated above 550° C. in an inert gas atmosphere to collapse micropores in the porous glass product, thereby obtaining a glass product having a refractive index gradient which is transparent and free of light-scattering and coloration. The glass product is suitable as materials (preforms) for optical fibers or materials for rod-shaped lenses, particularly rod-shaped microlenses for microlens arrays and microlenses for coupling an optical fiber and a light source.

5 Claims, 1 Drawing Sheet

PROCESS FOR PRODUCING TRANSPARENT GLASS PRODUCT HAVING REFRACTIVE INDEX GRADIENT

This is a continuation of application Ser. No. 699,422 filed Feb. 7, 1985, now abandoned.

FIELD OF THE INVENTION

The present invention relates to a process for producing a transparent glass product having a refractive index gradient. More particularly, it is concerned with a process for producing a transparent glass product having a refractive index gradient which is suitable for use as materials (preforms) for optical transmission fibers or materials for rod-shaped lenses, particularly rod-shaped microlenses for microlens arrays, microlenses for coupling an optical transmission fiber and a light source, and so forth.

BACKGROUND OF THE INVENTION

The molecular stuffing method is known as a process for producing a glass product having a refractive index gradient. In accordance with this method, a dopant (a refractive index correction component) is allowed to fill micropores of a porous glass product in such a manner that a dopant concentration gradient is formed in the porous glass product and the micropores are collapsed by applying a heat treatment (calcination). U.S. Pat. No. 4,110,093 discloses a process for producing a glass product having a refractive index gradient which comprises permeating a dopant solution in the porous glass product, leaching out a part of the dopant from the porous glass product to form a concentration gradient of the dopant distributed in the micropores of the porous glass product, precipitating the dopant in the micropores, drying the glass product, and then subjecting to a heat treatment to collapse the micropores.

It is also known that of dopants which can be used in the molecular stuffing method, a thallium compound such as thallium nitrate or thallium nitrite gives a relatively large refractive index gradient.

Glass products having a refractive index gradient which are used as rod-shaped microlenses for microlens arrays and microlenses coupling an optical communication fiber and a light source are required to be optically transparent. In producing glass products of this type by the molecular stuffing method, it is necessary to avoid the use of dopants which cause defects responsible for light scattering, viz., dopants which cause a phase separation in the glass product or precipitate crystals in the glass product. In fact, when rod-shaped glass products having a refractive index gradient are produced using thallium compounds which are known to provide a relatively large refractive index gradient, by the molecular stuffing method disclosed in U.S. Pat. No. 4,110,093 described above, bluish white turbidity is undesirably formed in the central portion of the glass product.

SUMMARY OF THE INVENTION

As a result of extensive investigations to find the casue of the above-described bluish white turbidity, it has been found that a thallium compound precipitated in micropores of a porous glass product is converted into thallium oxide ($Tl_2O_3$) by thermal decomposition during the heat treatment of the glass product and a phaseseparation due to trivalent thallium ions of the oxide results in the formation of the bluish white turbidity. It has been also found that if trivalent thallium formed during the heat treatment step is reduced to monovalent thallium by heat treating the glass product in a reducing gas atmosphere, the formation of the above turbidity can be prevented.

Accordingly, an object of the present invention is to provide a process for producing an optically transparent glass product having a refractive index gradient using a thallium compound which provides a relatively large refractive index gradient as a dopant in the molecular stuffing method.

The process for producing a transparent glass product having a refractive index gradient according to the present invention comprises:

permeating a thallium compound solution in micropores of a porous glass product;

leaching out a part of the thallium compound in the micropores to form a concentration gradient of the thallium compound in the porous glass product;

precipitating the thallium compound in the micropores;

drying the porous glass product;

heating up the porous glass product in a reducing gas atmosphere to the temperature region of 350° to 550° C. at a temperature-rising rate of 25° to 150° C./hour; and heat treating the porous glass product in an inert gas atmosphere above 550° C. to collapse the micropores.

DETAILED DESCRIPTION OF THE INVENTION

Figure 1:
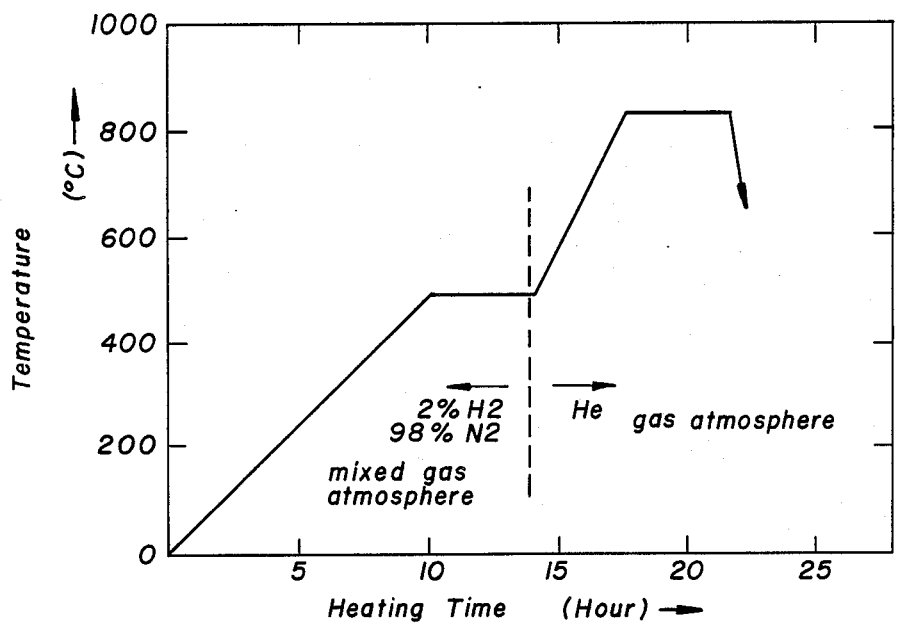
FIG. 1 is a graph showing the heat treatment schedule employed in Example 1 of the present invention.

A porous glass as used herein can be easily produced from a borosilicate glass capable of undergoing a phase-separation. For example, a porous glass containing continuous micropores can be produced by the conventional process comprising heat treating the borosilicate glass under prescribed conditions to separate it into an $SiO_2$-rich acid-insoluble phase and an alkali metal oxide/$B_2O_3$-rich easily acid-soluble phase and treating the glass with an acid to leach the easily acid-soluble phase.

In the molecular stuffing method of the present invention, a thallium compound such as thallium nitrite ($TlNO_2$) or thallium nitrate ($TlNO_3$) is used as a dopant. In addition, other compounds can be used as the dopant in combination with the thallium compounds so long as they do not cause phase-separation or crystallization The dopant solution is permeated in the porous glass product (stuffing) and a part of the dopant in the micropores is leached out from the glass product (unstuffing) to form a concentration gradient of the dopant in the porous glass product. The dopant is then precipirated in the micropores. This can be attained by dipping the porous glass product in a solvent, the solubility of the dopant in which is low, such as methanol or ethanol, at a low temperature, so that the solvent in the micropores is exchanged. The porous glass product in which the dopant has been precipitated is generally dried in air and then subjected to a heat treatment.

In the heat treatment of the present invention, the above-dried porous glass product is first heated up to the temperature region of 350° to 550° C., preferably 400° to 500° C., at a temperature-rising rate of from 20° to 150° C./hour in a reducing gas atmosphere containing hydrogen or carbon monoxide to reduce the valence of thallium to +1 (monovalent thallium) and subsequently the porous glass product is heated above 550° C. in an inert gas atmosphere such as nitrogen, carbon dioxide or helium, to collapse the micropores. In this case, it is desirable that before the heating atmosphere is changed from the reducing gas to the inert gas, the porous glass product be held in the reducing gas atmosphere at the reached temperature for 2 to 24 hours, preferably 4 to 12 hours, and the heating in the inert gas atmosphere be performed at a temperature-rising rate of 50° to 150° C./hour.

If the heating temperature in the reducing gas atmosphere is lower than 350° C., thallium is reduced insufficiently and there is a danger of turbidity being formed. On the other hand, if the heating temperature is higher than 550° C., the reduction proceeds excessively, resulting in formation of metallic thallium and there is a tendency that the glass product turns black in color. Thus, the upper limit of the heating temperature on the reducing gas atmosphere is limited to the range of 350° to 550° C.

In the heat treatment of the present invention, the porous glass product is heated in the reducing gas atmosphere and then heated in the inert gas atmosphere at higher temperatures. However, if the micropores of the porous glass product can be completely collapsed within the temperature range of 350° to 550° C. in the reducing gas atmosphere, the heat treatment in the inert gas atmosphere can be omitted.

After the micropores of the porous glass product are collapsed by the heat treatment according to the present invention, the glass product is allowed to stand in air to cool it, whereby a transparent glass product having a refractive index gradient can be obtained.

The present invention is described in greater detail by reference to the following examples. Unless otherwise indicated, all percents, parts, ratios and the like are by weight.

EXAMPLE 1

A glass composition comprising 54.50% $SiO_2$, 5.20% $Na_2O$ and 6.00% $K_2O$ was melted at 1,450° C. for 3 hours while stirring for about 1 hour during melting. The melt was poured into a mold and maintained at 480° C. for 2 hours. The mold was allowed to stand in a furnace to cool, thereby obtaining a glass block. A glass rod having a diameter of about 4 mm and a length of 100 mm was cut out from the glass block. The glass rod was heated at 540° C. for 120 hours to cause a phase-separation and, thereafter, the rod was treated in 1.5N sulfuric acid at 100° C. for 24 hours to obtain a porous glass rod.

The porous glass rod was dipped in a solution of 80 g of $TlNO_3$ dissolved in 100 ml of water at a temperature of 100° C. for 24 hours to achieve the stuffing and then dipped in an aqueous solution containing 40% by volume of ethanol at a temperature 70° C. for 40 minutes to achieve the unstuffing. The porous glass rod was further dipped in ethanol maintained at 0° C. for 3 hours to precipitate the dopant in micropores and then was dried in air.

The glass rod was then heat treated according to the heating schedule as shown in FIG. 1. That is, the dried glass rod was heated up to 500° C. at a temperature-rising rate of 50° C./hour in a mixed gas atmosphere of 2 vol % $H_2$ and 98 vol % $N_2$ and maintained at 500° C. for 4 hours. The atmosphere in the furnace was exchanged with He gas. Thereafter, the glass rod was heated up to 850° C. at a temperature-rising rate of 100° C./hour in the He gas atmosphere, maintained at 850° C. for 4 hours and then allowed to stand in the furnace to cool it.

The thus-obtained glass rod was an optically transparent glass product free of light scattering and coloration, and having a refractive index gradient.

EXAMPLE 2

Figure 2:
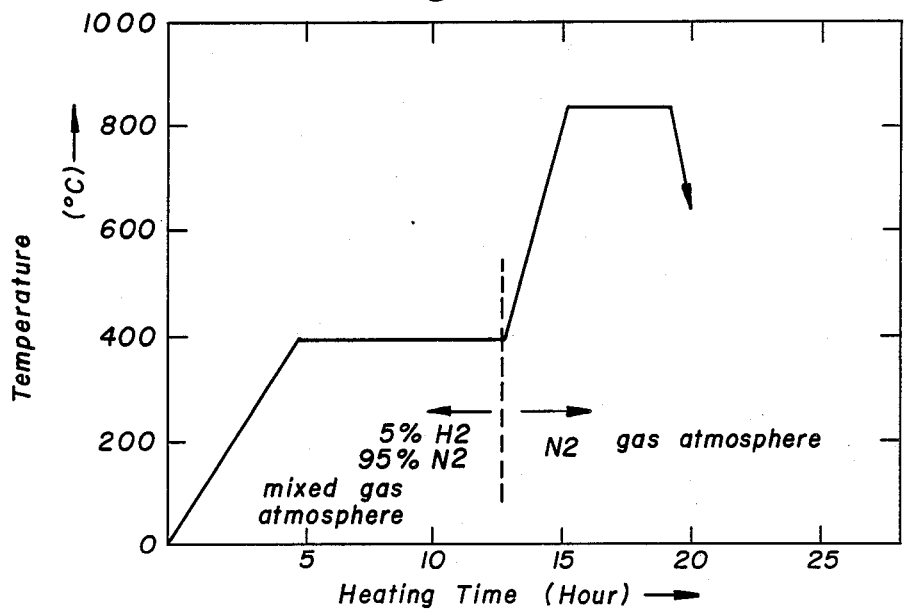
FIG. 2 is a graph showing the heat treatment schedule employed in Example 2 of the present invention.

A porous glass rod produced in the same manner as in Example 1 was heat treated according to the heating schedule as shown in FIG. 2. That is, the dried glass rod was heated up to 400° C. at a temperature-rising rate of 80° C./hour in a mixed gas atmosphere of 5 vol % $H_2$ and 95 vol % $N_2$ and maintained at 400° C. for 8 hours. The atmosphere in the furnace was exchanged with $N_2$ gas. Thereafter, the glass rod was heated up to 850° C. at a temperature-rising rate of 100° C./hour in the $N_2$ gas atmosphere, maintained at 850° C. for 4 hours and then allowed to stand in the furnace to cool it.

The thus-obtained glass rod was an optically transparent glass product free of light scattering and coloration, and having a refractive index gradient.

In the process of the present invention, as can be seen from the above results, trivalent thallium resulting from thermal decomposition of the thallium dopant is reduced to monovalent thallium, but not to metallic thallium. Thus, even if a thallium compound providing a relatively large refractive index gradient is used in a high concentration as a dopant for the molecular stuffing method, the ultimate glass product having a refractive index gradient is free of coloration and discoloration.

While the invention has been described in detail and with reference to specific embodiments thereof, it will be apparent to one skilled in the art that various changes and modifications can be made therein without departing from the spirit and scope thereof.

What is claimed is:

1. A process for producing a transparent glass product free from bluish white turbidity having a refractive index gradient comprising the steps of:
    (a) permeating a solution of thallium nitrate or thallium nitrite into the micropores of a porous glass product;
    (b) leaching out a part of the thallium nitrate or thallium nitrite in the micropores to form a concentration gradient thereof in the porous glass product;
    (c) precipitating the thallium nitrate or thallium nitrite remaining in the mircopores;
    (d) drying the porous glass product;
    (e) heating the dried porous glass product to the temperature region of 350° to 550° C. at a temperature-rising rate of 25° to 150° C./hour in a reducing gas atmosphere whereby the thallium is present as monovalent thallium; and
    (f) heat treating the porous glass product above 550° C. in an inert gas atmosphere to collapse the micropores thereby producing a transparent glass product free from bluish white turbidity having a refractive index gradient.

2. Process according to claim 1, wherein said reducing gas atmosphere consists essentially of hydrogen or carbon monoxide.

3. The process as claimed in claim 1, wherein the dried glass is heated in step (e) up to 400° to 500° C.

4. The process as claimed in claim 1, wherein prior to the heat treatment in the inert gas atmosphere in step (f), the porous glass product is maintained at the temperature used in step (e) for 2 to 24 hours in the same reducing gas atmosphere.

5. The process according to claim 1, wherein in said step (e) of said process the temperature rising rate is at least 50° C./hour.